United States Patent
Frazier et al.

(10) Patent No.: US 9,495,138 B1
(45) Date of Patent: Nov. 15, 2016

(54) SCHEME FOR VERIFYING THE EFFECTS OF PROGRAM OPTIMIZATIONS

(71) Applicant: International Business Machines Corporation, Armonk, NY (US)

(72) Inventors: Giles R. Frazier, Austin, TX (US); Michael Karl Gschwind, Chappaqua, NY (US); Christian Jacobi, Poughkeepsie, NY (US); Anthony Saporito, Highland, NY (US); Chung-Lung K. Shum, Wappingers Falls, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/987,377

(22) Filed: Jan. 4, 2016

(51) Int. Cl.
*G06F 9/45* (2006.01)

(52) U.S. Cl.
CPC ............ *G06F 8/443* (2013.01); *G06F 8/4441* (2013.01)

(58) Field of Classification Search
CPC ........................................ G06F 8/443–8/4442
USPC .................................. 717/126–127, 151–154
See application file for complete search history.

(56) References Cited

U.S. PATENT DOCUMENTS

| | | | | |
|---|---|---|---|---|
| 5,857,104 A * | 1/1999 | Natarjan | ............... | G06F 8/4451 712/239 |
| 6,412,107 B1 * | 6/2002 | Cyran | .................. | G06F 9/45525 717/148 |
| 6,519,765 B1 * | 2/2003 | Kawahito | ............... | G06F 8/443 711/108 |
| 6,634,023 B1 * | 10/2003 | Komatsu | ................. | G06F 8/445 717/124 |
| 6,971,091 B1 * | 11/2005 | Arnold | ..................... | G06F 8/443 717/130 |
| 7,082,486 B2 * | 7/2006 | DeWitt, Jr. | ............. | G06F 13/24 710/260 |
| 7,272,830 B2 * | 9/2007 | de Jong | .................. | G06F 9/445 714/E11.207 |
| 7,574,587 B2 * | 8/2009 | DeWitt, Jr. | ......... | G06F 9/30181 700/78 |
| 7,882,396 B2 * | 2/2011 | Bolignano | .............. | G06F 11/28 714/37 |
| 8,381,196 B2 | 2/2013 | Warren et al. | | |
| 8,554,811 B2 * | 10/2013 | Mariani | .............. | G06F 11/3409 707/899 |
| 8,584,104 B2 * | 11/2013 | Gibbons | ................. | G06F 8/433 717/140 |
| 8,694,978 B1 * | 4/2014 | Rus | ......................... | G06F 8/443 717/140 |
| 8,972,975 B1 * | 3/2015 | Rogers | ..................... | G06F 8/61 717/154 |

(Continued)

OTHER PUBLICATIONS

Automatic Generation of Peephole Superoptimizers—Sorav Bansal and Alex Aiken—Computer Systems Lab—Stanford University—ASPLOS'06 Oct. 21-25, 2006, San Jose, California, USA.*

(Continued)

*Primary Examiner* — Francisco Aponte
(74) *Attorney, Agent, or Firm* — Cantor Colburn LLP; William A. Kinnaman, Jr.

(57) ABSTRACT

Techniques relate for verifying an effect of software program optimization. A determination is made whether a fingerprint is present in a software application that is currently executing on a processor of a computer system, where the fingerprint includes a representation of a sequence of behavior that occurs on the processor while the software application is executing. The fingerprint corresponds to an optimization made to the software application. In response to determining that the fingerprint is not present in the software application currently executing on the processor, it is determined that the optimization to the software application did not have an intended effect. In response to determining that the fingerprint is present in the software application executing on the processor, it is recognized that the optimization to the software application has the intended effect.

15 Claims, 6 Drawing Sheets

(56) References Cited

U.S. PATENT DOCUMENTS

| | | | | |
|---|---|---|---|---|
| 9,195,486 B2* | 11/2015 | Porras | G06F 9/45525 |
| 9,250,939 B2* | 2/2016 | Odaira | G06F 9/4552 |
| 9,280,438 B2* | 3/2016 | Indukuru | G06F 8/4442 |
| 2003/0204839 A1* | 10/2003 | Kawahito | G06F 8/4441 | 717/130 |
| 2004/0044731 A1* | 3/2004 | Chen | H04L 67/2842 | 709/203 |
| 2005/0155026 A1* | 7/2005 | DeWitt | G06F 8/443 | 717/158 |
| 2005/0235268 A1* | 10/2005 | Baldischweiler | G06F 8/4436 | 717/136 |
| 2007/0006167 A1* | 1/2007 | Luk | G06F 9/45525 | 717/130 |
| 2007/0162896 A1* | 7/2007 | Geva | G06F 8/443 | 717/130 |
| 2008/0127120 A1* | 5/2008 | Kosche | G06F 11/3447 | 717/131 |
| 2011/0246974 A1* | 10/2011 | Kawachiya | G06F 8/4441 | 717/148 |
| 2012/0311552 A1* | 12/2012 | Dinn | G06F 9/45525 | 717/154 |
| 2013/0166634 A1* | 6/2013 | Holland | H04L 67/2804 | 709/203 |
| 2014/0059334 A1 | 2/2014 | Indukuru et al. | | |

OTHER PUBLICATIONS

Giles R. Frazier, et al.,"Automated Compiler Operation Verification," U.S. Appl. No. 14/987,400, filed Jan. 4, 2016.

Giles R. Frazier, et al.,"Code Fingerprint-Based Processor Malfunction Detection," U.S. Appl. No. 14/987,395, filed Jan. 4, 2016.

Giles R. Frazier, et al.,"Configurable Code Fingerprint," U.S. Appl. No. 14/987,220, filed Jan. 4, 2016.

Giles R. Frazier, et al.,"Programmable Code Fingerprint," U.S. Appl. No. 14/987,263, filed Jan. 4, 2016.

IBM, "Power ISA V 2.07B," Power.org, Book II, Apr. 9, 2015, pp. 733-838.

Jonathan D. Bradbury, et al.,"Behavior Based Code Recompilation Triggering Scheme," U.S. Appl. No. 14/987,346, filed Jan. 4, 2016.

List of IBM Patents or Patent Applications Treated as Related; POU920150400US1; Date Filed: Jan. 4, 2016, pp. 1-2.

W. Yoo, et al.," Automated Fingerprinting of Performance Pathologies Using Performance Monitoring Units (PMUs)", Intel Corp., Department of Computer Science, University of Illinois, Genomics Workflow, Sep. 1, 2014, pp. 1-6.

\* cited by examiner

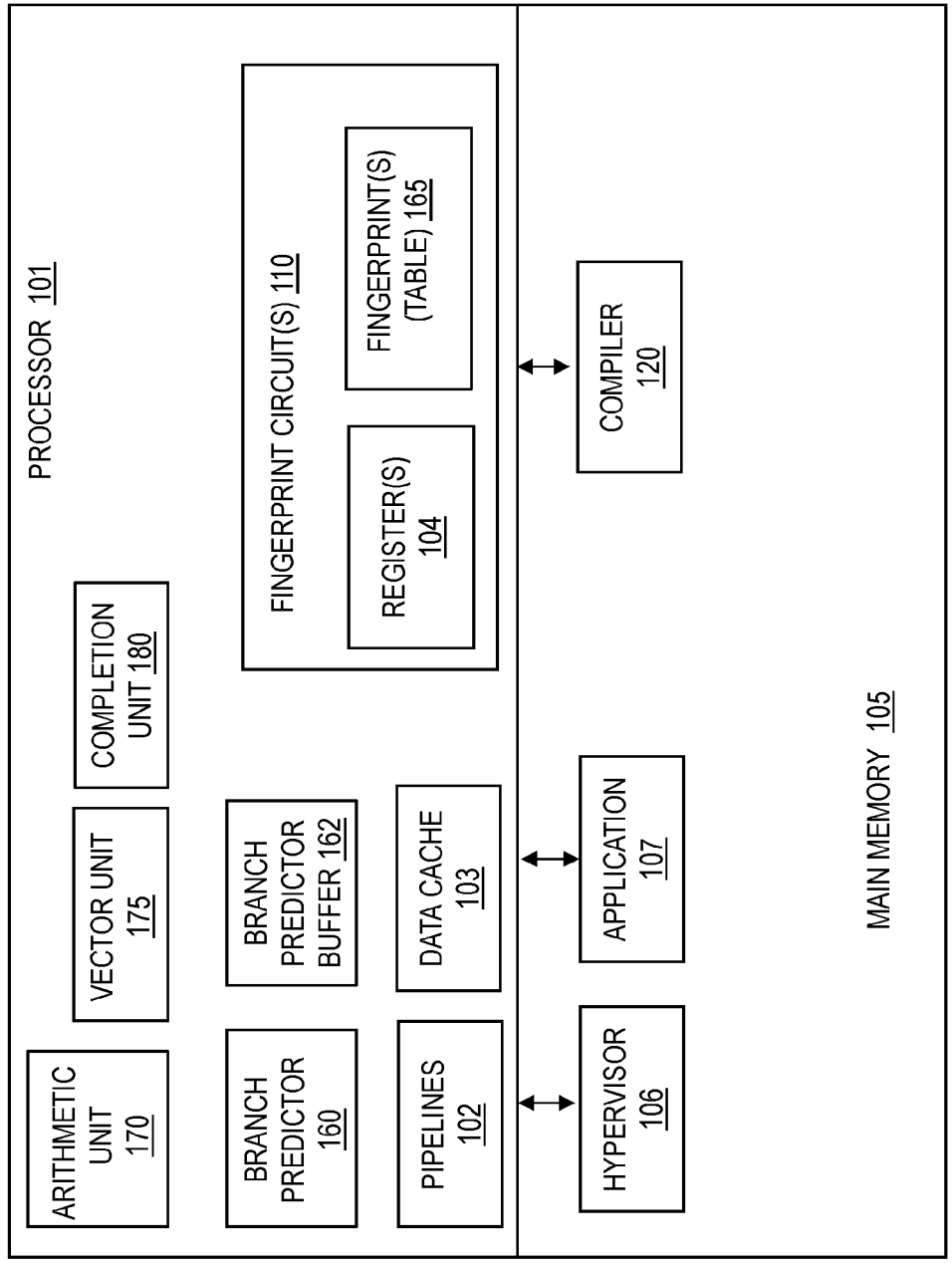

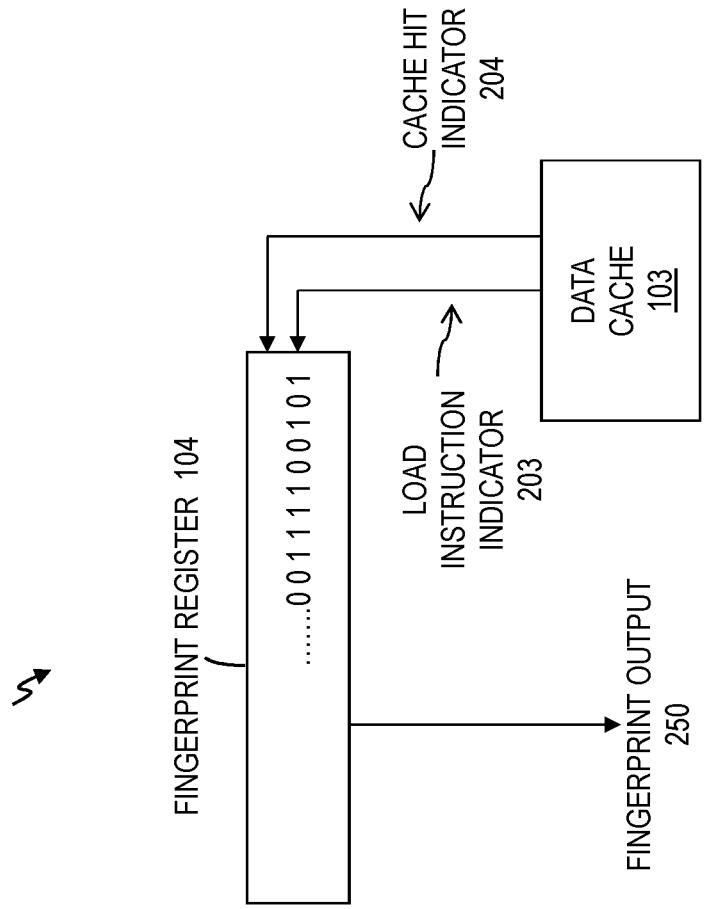

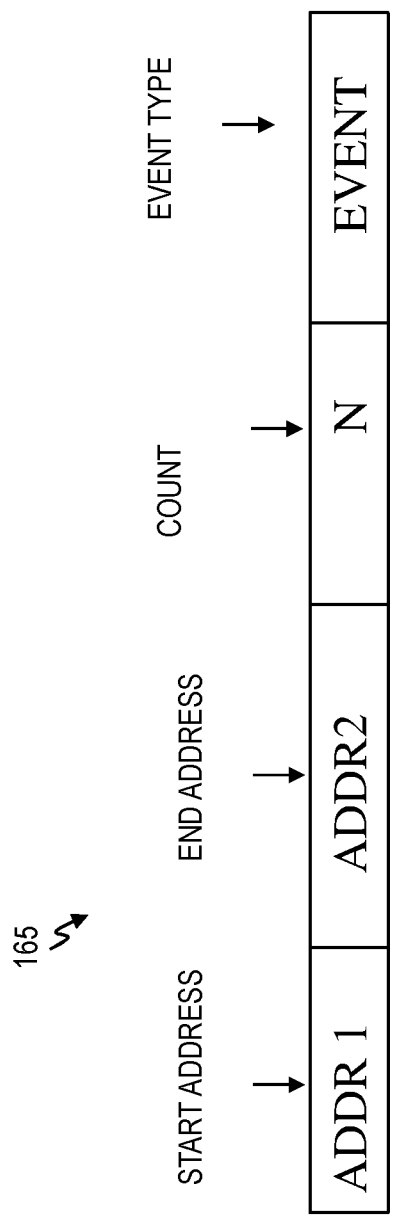

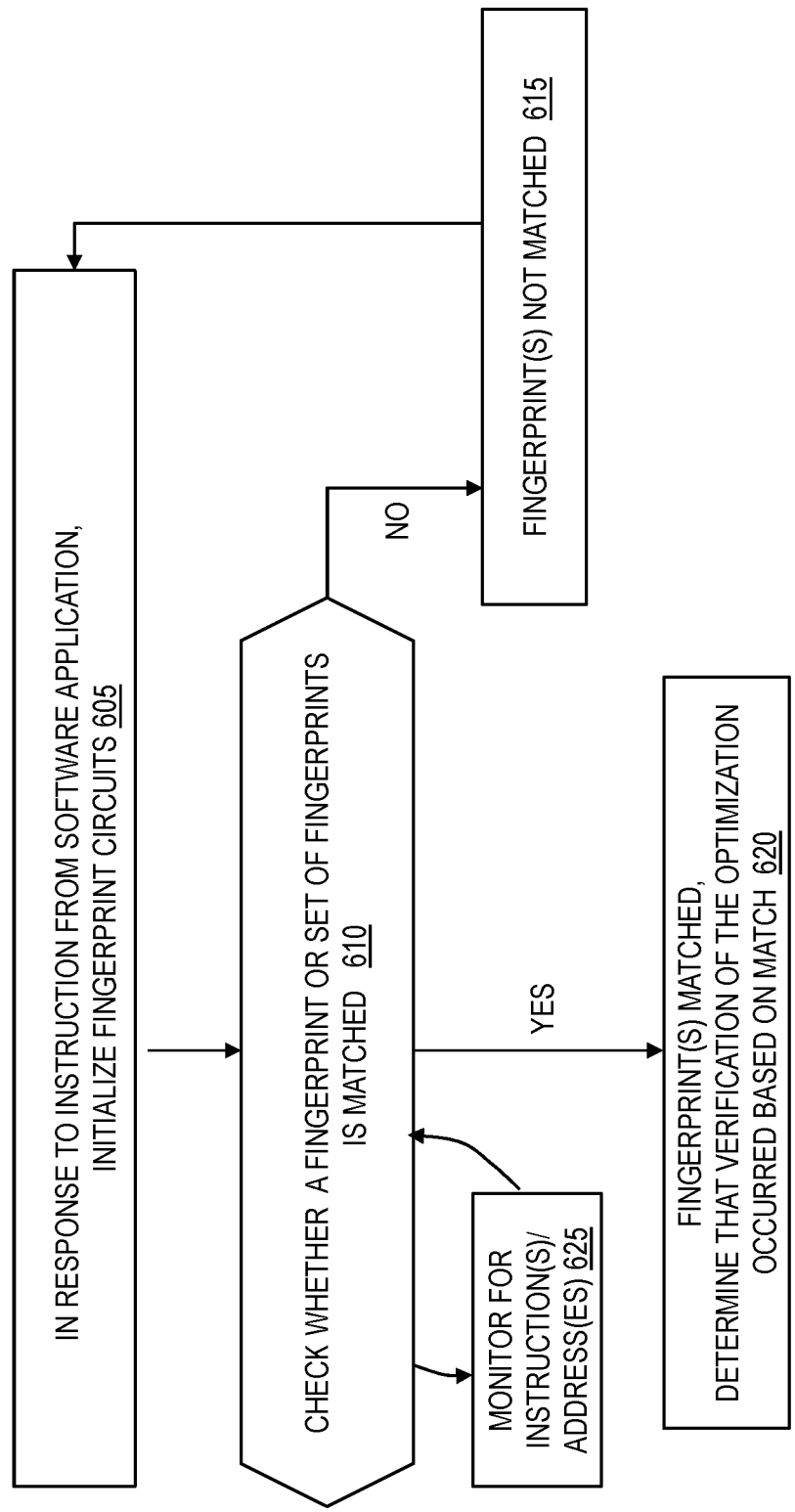

SCHEME FOR VERIFYING THE EFFECTS OF PROGRAM OPTIMIZATIONS

BACKGROUND

The present invention relates generally to computer processors, and more specifically, to scheme for verifying the effects of application-level program optimizations.

In computer science, program optimization or software optimization is the process of modifying a software system to make some aspect of it work more efficiently or use fewer resources. In general, a computer program may be optimized so that it executes more rapidly, is capable of operating with less memory storage or other resources, or draws less power. Optimization can occur at a number of levels, including at the hypervisor, operating system, compiler, middleware, or application level. Typically the lower level optimizations such as operating system optimizations have greatest impact since they are used by multiple applications, but these levels are the most difficult to optimize and may even require changes to industry standards. Application level optimization, therefore, is often the best and fastest level at which to direct optimization efforts.

SUMMARY

Embodiments include a method, system, and computer program product for verifying an effect of software program optimization. A determination is made whether a fingerprint is present in a software application that is currently executing on a processor of a computer system, where the fingerprint includes a representation of a sequence of behavior that occurs on the processor while the software application is executing. The fingerprint corresponds to an optimization made to the software application. In response to determining that the fingerprint is not present in the software application currently executing on the processor, it is determined that the optimization to the software application did not have an intended effect. In response to determining that the fingerprint is present in the software application executing on the processor, it is recognized that the optimization to the software application has the intended effect.

BRIEF DESCRIPTION OF THE DRAWINGS

FIG. 1 depicts a computer system for implementing schemes for verifying the effects of application-level software program optimizations in accordance with an embodiment.

FIG. 2 depicts a fingerprint recognition function of a fingerprint circuit in accordance with an embodiment.

FIG. 5 depicts an example fingerprint table according to an embodiment.

FIG. 6 depicts a flow chart of a scheme for verifying the effects of application program optimizations in accordance with an embodiment.

DETAILED DESCRIPTION

Figure 3A:
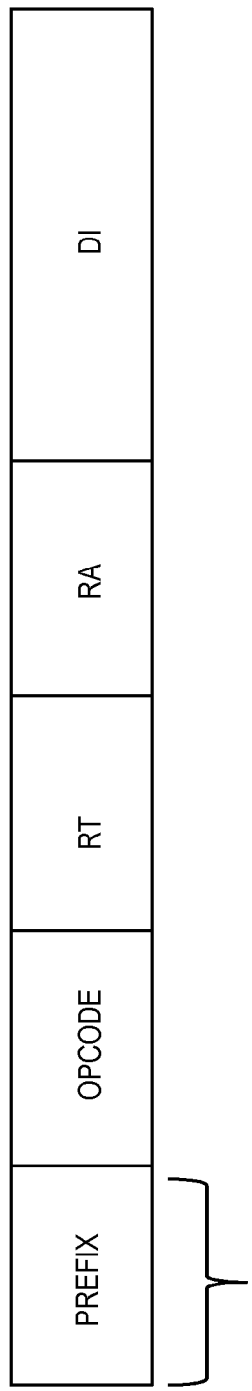
FIG. 3A depicts an instruction with an example prefix field for a prefix according to an embodiment.

After program optimizations are made, a performance profile of some aspect of the behavior of the program before optimization is compared with the profile after the optimizations. Such profiles typically consist of average values of selected performance metrics such as cache hit rates, branch prediction rates, response time, etc., over an entire program. Since the profile depicts only overall average behavior over very large blocks of code, however, it is often difficult to determine if the observed profile improvement is the direct result of the optimizations made in specific code segments, or whether it is due to some other unknown cause. This lack of knowledge of the actual reason for an observed overall performance improvement often leads to incorrect conclusions about why a program behaves as it does, causing further optimization to be misguided.

As an example, it is assumed that a loop is unrolled with the aim of improving performance such as cache hit rate, and subsequent profile measurements indicate that the overall cache hit rate is improved. Even though the cache hit rate has improved, however, there is no guarantee that the improved cache hit rate is the direct result of the unrolling of the specific loop that was unrolled since it may actually be due to some secondary effect unknown to the programmer.

Now turning to the figures, FIG. 1 depicts a computer system 100 configured to implement schemes for verifying the effects of software program optimizations in accordance with an embodiment. The computer system 100 includes a processor 101 in communication with a main memory 105. The processor 101 includes one or more processor pipelines 102 that execute instructions using cache memory 103. Computer programs, such as hypervisor 106 and software application 107 are stored in main memory 105 and executed by the processor 101. Any appropriate number of software applications may be executed by a computer system such as computer system 100. In the computer system 100, the software application 107 may be high-level source code is compiled by a compiler 120 for execution on the processor 101. The hypervisor 106, applications 107, and/or any other program stored in main memory 105 may all be considered software programs, software, code, etc. Examples are provided for verifying optimizations to software application 107. The verification of optimizations to the software application 107 may be implemented by using the compiler 120 that operates with hardware at the machine level.

The processor 101 includes a branch predictor 160. The branch predictor 160 may be a digital circuit designed to predict either the direction (e.g., taken or not taken) and target address of a branch instruction before it is executed. The purpose of the branch predictor 160 is to improve the flow of instructions in the pipeline of the processor 101. The history of whether a branch instruction at a given address is taken or not taken, and in some cases target address of the branch instruction, is stored in the branch predictor buffer 162.

The processor 101 includes one or more fingerprint circuits 110 designed to monitor the execution of software programs (e.g., application 107, hypervisor 106) on the processor 101. The fingerprint circuit 110 includes predefined/specified code fingerprints 165. In some embodiments, the fingerprints 165 may be implemented as fingerprint tables. The fingerprint circuit 110 is configured to automatically monitor the software program execution of, e.g., the application 107, in order to recognize the occurrence of a specified fingerprint 165 which indicates verification of the software optimization. The fingerprint circuit 110 is also configured to alert the application 107 at that point (i.e., the segment of code) at which an expected fingerprint indicative of an optimization is not recognized.

When the specified fingerprint 165 indicative of an optimization is not recognized during execution of the software, the fingerprint circuit 110 is configured to issue an Event-Based Branch (EBB), also referred to as a "lightweight interrupt," that transfers control to a software EBB handler without involving the operating system. Since operating system involvement causes a large amount of overhead, such direct transfer of control to the application-level EBB handler significantly improves performance. The software program is therefore able to immediately analyze the code and state of the processor at the point at which the software optimization should have been recognized and rapidly take the necessary corrective action.

Various counters and modules may be utilized to count incoming events and compare against a predefined number of events to determine when a fingerprint is recognized. FIG. 1 may include a fingerprint recognition function in the fingerprint circuit 110 according to an embodiment for which fingerprints 165 consist of counts of event occurrences between two specified instructions. Examples of such fingerprints may include a count of pipeline stalls, data cache prefetch misses, branch taken/not taken prediction misses, and/or a branch target hit/miss prediction hits/misses. It is appreciated that other fingerprints may also be included in the hardware of the fingerprint circuits 110.

The fingerprint circuit 110 may comprise one or more fingerprint shift registers 104 in some embodiments. The fingerprint shift register 104 is used to store the output of the software code that is currently executing, such that the output (value) of the fingerprint shift register 104 is compared to the fingerprint 165 to determine a match. The fingerprint shift register 104 is a physical register that contains measured fingerprints. Also, the fingerprint circuit 110 includes logic circuits to function as discussed herein. In one implementation, the fingerprint circuit 110 may also include firmware, microcode, etc., to execute the functions discussed herein.

In one implementation, the fingerprint circuit 110 may monitor execution of the software program 107 in order to determine a match to a single specified fingerprint 165. In response to finding the match, the fingerprint circuit 110 is configured to indicate that the intended optimization has occurred.

In another implementation, the fingerprint circuit 110 may monitor execution of the software program 107 in order to determine a match to a combination (set) of specified fingerprints 165, such as two or more different specified fingerprints 165. In response to finding the match to the combination of specified fingerprints 165 (e.g., two or more different specified fingerprints 165), the fingerprint circuit 110 is configured to indicate that the specified fingerprint has been recognized and determine that that the intended optimization to the software application 107 has taken effect. However, when the specified fingerprint(s) 165 are not recognized, the fingerprint circuit 110 is configured to determine that the optimization to the application 107 did not occur.

For illustration purposes and not limitation, a few examples of code fingerprints 165 are discussed.

1) One code fingerprint may be a data cache hit miss sequence. For example, the data cache hit and miss sequence may be [hit, hit, miss, miss, hit, miss, miss] for one code fingerprint. This same data cache hit and miss sequence may be represented by [1100100] in the fingerprint shift register 104, where '1' represents a hit and '0' represents a miss. In one implementation, the fingerprint register 104 may store the actual output of the software program 107 currently executing on the processor 101, such that the fingerprint circuit 110 can check the fingerprint shift register 104 and recognize when the output of the software program 107 in the fingerprint shift register 104 matches the data cache hit miss sequence of an expected fingerprint 165.

2) Another code fingerprint may be a data cache hit miss sequence that is present when a given instruction is executed. The given instruction may have a predefined address (XYZ). As noted above for illustration purposes, the data cache hit miss sequence may be the sequence of cache hits and misses [hit, hit, miss, miss, hit, miss, miss] that occurred in load instructions leading up to the instruction at address XYZ. In this case, the fingerprint circuit 110 waits for execution of the given instruction of the software program 107 and only checks the fingerprint register 104 at the time when the given instruction (with address XYZ) executes.

3) A code fingerprint may be branch prediction hit miss sequence for a specific set of branches identified by an instruction prefix. In such an embodiment, branch instructions have an operand that identifies whether or not they are to be used in the fingerprint. When a branch with an operand indicating that it is part of the fingerprint is executed, either a 1 or a 0 is shifted into a fingerprint register 104, depending on whether the prediction was a correct prediction or misprediction.

4) Another code fingerprint may be a branch history value when a given instruction is executed. In such an embodiment, the fingerprint consists of a sequence of 0's and 1's, where 1 means the branch was taken, and 0 means the branch was not taken. When a branch instruction is executed, either a 1 or a 0 is shifted into a fingerprint register 104, depending on whether the branch was taken or not taken.

5) A code fingerprint may be a call signature at a given instruction, where the call signature is a binary value that is a function of the sequence of call and return instructions that have previously been executed when an instruction is executed. Such a fingerprint may also be a historical sequence of successive call signatures at a given instruction that consists of a number of most-recent values of the call signature at the given instruction.

6) Another code fingerprint may be the value of come from address register (CFAR) of the processor 101 at a given instruction, where the CFAR contains the address of the most-recently executed branch instruction that was taken.

7) There may also be code fingerprints that consist of counts of various events that occur between two instructions, such as pipeline cache stalls, data cache hits or misses, etc.

In embodiments, it should be appreciated that the fingerprint circuit 110 provides the ability to specify a particular fingerprint, and to continuously monitor execution of a software program 107 while checking if that fingerprint is recognized. Upon recognition of the fingerprint, the fingerprint circuit 110 recognizes a verification that the intended optimization has occurred and allows the application 107 to execute without interruption. However, if the fingerprint is not matched/recognized, the fingerprint circuit 110 immediately issues a lightweight interrupt that alerts application 107 that the intended optimization has not occurred.

FIG. 2 depicts a fingerprint recognition function/detector of the fingerprint circuit 110 according to an embodiment. A fingerprint recognition function/detector may include hardware that detects, e.g., a specific sequence of load instruction data cache hits and misses in the shift register. This shift register is referred to as a fingerprint register 104 in the processor 101, since the contents of the fingerprint register 104 represent the actual execution output of the processor 101 (actual fingerprint), which is in this case the sequence of the most-recent data cache hits and misses. Such a fingerprint register 104 may be of arbitrary length. In one implementation, either 32 or 64 bits may be suitable for the fingerprint register 104.

In FIG. 2, the sequence of 1's and 0's in the fingerprint register 104 may represent the most-recent history of load instruction data cache hits and misses, where a '0' indicates a data cache miss and a '1' indicates a data cache hit. An implementation may have one of these fingerprint registers 104 for each level of the cache. As shown in FIG. 2, fingerprint register 104 receives input from a cache 103 (and/or from main memory 105) via load instruction indicator 203 and cache hit indicator 204. Whenever load instruction indicator 203 indicates a load instruction, a '1' is input into the fingerprint shift register 104 if the instruction results in a cache hit, and a '0' is loaded into the fingerprint shift register 104 when the instruction results in a cache miss (i.e., a load instruction with no cache hit). An observed fingerprint is output on fingerprint output 250; the observed fingerprint gives a snapshot of the cache hit/miss behavior of the current workload and may be used to identify the recent cache hit/miss behavior of load instructions in the workload. The fingerprint register 104 may be of any appropriate size, and the observed fingerprint that is output on fingerprint output 250 may be the entire contents of the fingerprint register 104 in some embodiments or a subset of the contents of fingerprint register 104. FIG. 2 is shown for illustrative purposes only; a fingerprint module comprising a shift register may measure any aspect of processor performance in various embodiments such as branch prediction hits and misses, branches taken and not taken, etc., where a 1 represents a correctly predicted or taken branch and a 0 represents a mispredicted or not taken branch, respectively.

Figure 3B:
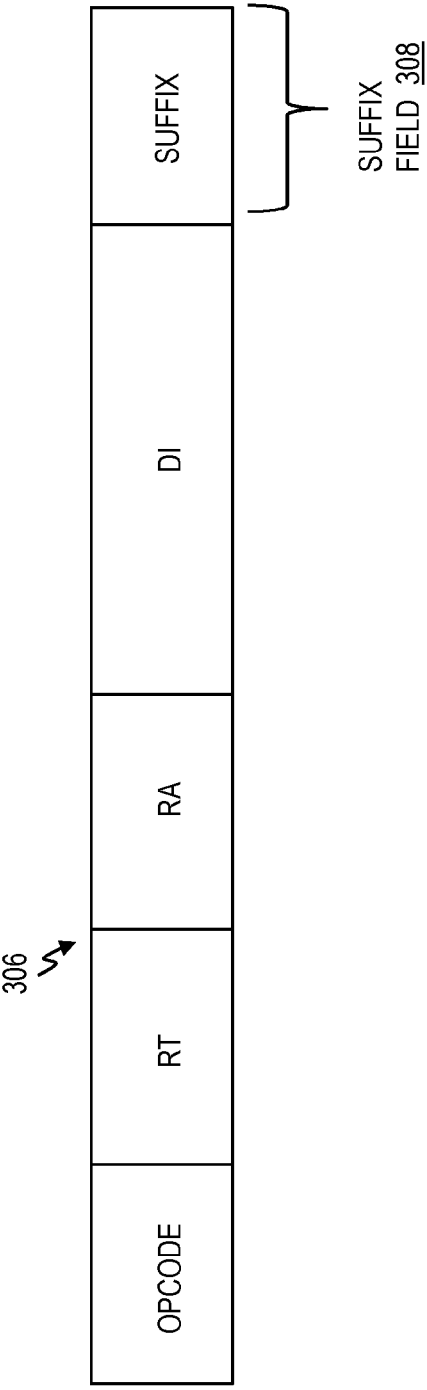
FIG. 3B depicts an instruction with an example suffix field for a suffix according to an embodiment.

The instruction at which to sample the fingerprint register 104 in FIG. 2 may be identified by an instruction prefix or suffix, where the prefix or suffix consists of an additional field either at the beginning or end of the instruction image (i.e., the instruction). FIG. 3A depicts an instruction 302 with an example prefix field 304 for a prefix (e.g., XYZ), and FIG. 3B depicts an instruction 306 with an example suffix field 308 for a suffix (e.g., JKL), according to an embodiment. In FIGS. 3A and 3B, the prefix and suffix may be bits added to the beginning or end of the instruction images 302, 306. Most instructions have an opcode field and one or more operand fields. In the example instructions 302, 306, the instruction opcode is in the OPCODE field opcode, the destination register number (#) is in the RT field, and the source register number (#) is in the RA field, and the DI field is an input variable. The prefix field 304 is an additional field added before the instruction image, while the suffix field 308 is an additional field appended to the end of the instruction image. The prefix field 304 and the suffix field 308 can be set to a value to indicate that the respective field 304, 308 is included in the fingerprint and/or to indicate that the fingerprint 165 is sampled at that instruction.

Additionally, a special form of no operation (nop) instruction may be used to identify the instruction at which to sample the fingerprint.

Figure 4:
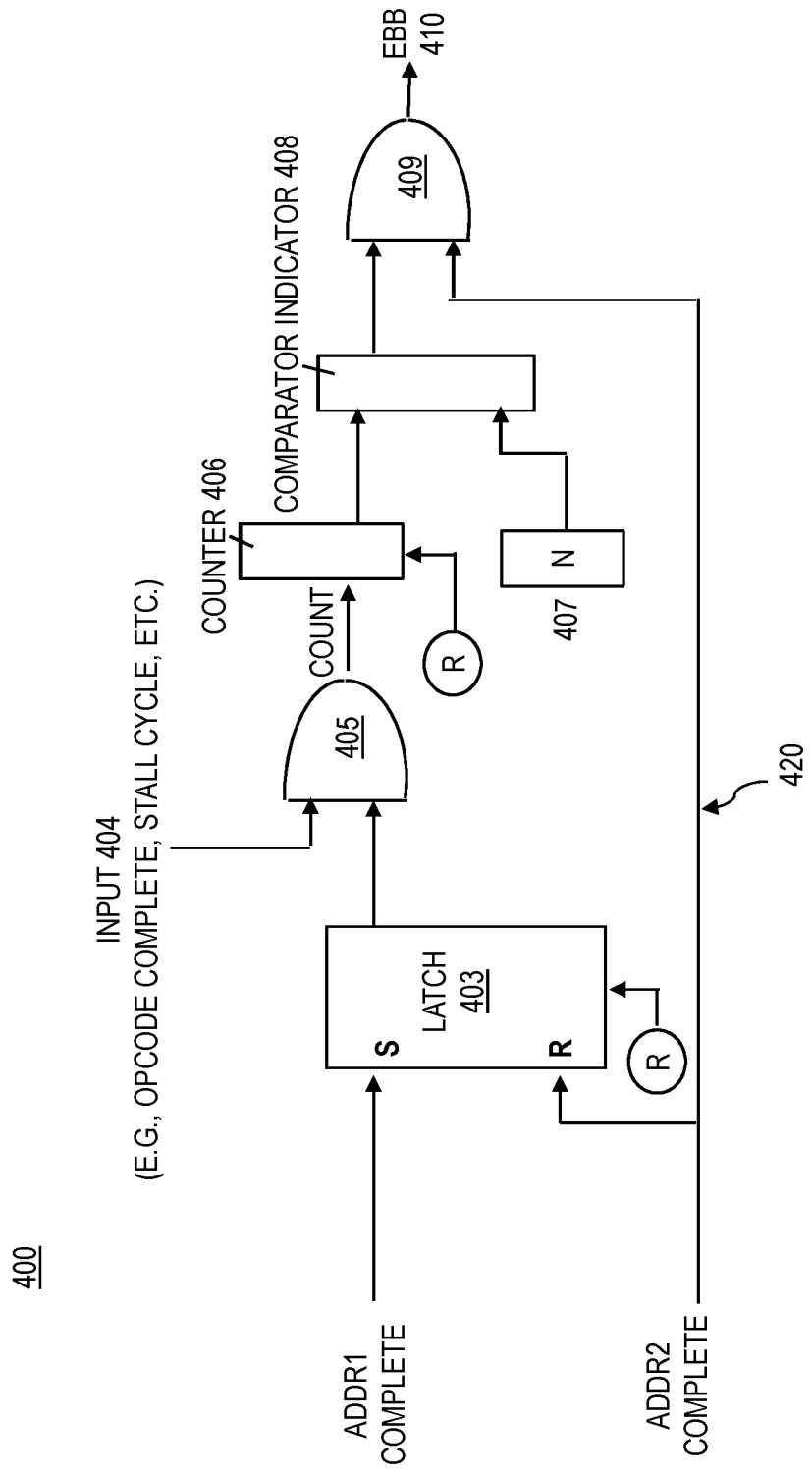
FIG. 4 depicts a fingerprint recognition function of the fingerprint circuit in accordance with an embodiment.

FIG. 4 depicts an example fingerprint recognizer/detector 400 for recognition of fingerprints that consists of counts of various events between two specified instructions according to an embodiment. The logic in FIG. 4 is initialized by resetting counter 406 and latch 403, as depicted by "R" in FIG. 4. After this initialization, latch 403 output is set to "1"
when the instruction at ADDR completes. Latch 403 output is sent to AND gate 405, which gates input signal 404 to counter 406 whenever latch 403 output signal is set to 1. Output of counter 406 is sent to comparator indicator 408, which compares output of counter 406 with a value, N. The value N is specified in fingerprint 165 in FIG. 5 as explained later. Finally, comparator indicator 408 is sent to AND gate 409, which outputs a signal if indicator is true when the instruction at ADDR2, which is specified in fingerprint 165 in FIG. 5, completes. The output of AND gate 409 causes an EBB 410. Thus, the EBB 410 occurs if counter 406 is either more (or less, depending on the embodiment) than N (407) when the instruction at ADDR2 completes. This EBB alerts the application that an excessive (or insufficient, depending on the embodiment) number of events (e.g., cache misses, stall cycles, etc.) have occurred between the completion of the instruction at ADDR1 and the instruction at ADDR2, and therefore that the intended optimization has not occurred. (The specific event that is counted is specified in fingerprint 165 in FIG. 5 as explained later.) If the value of counter 1006 is does not indicate that an excessive (or insufficient, depending on the embodiment) number of events have occurred when the instruction at ADDR2 is completed, however, then no EBB occurs. FIG. 4 is shown for illustrative purposes only; a software optimization fingerprint detector such as is shown in these figures may monitor any appropriate set of instruction completions and may, in some embodiments, simultaneously monitor multiple sets of instruction completions either between the same or different start and end addresses.

FIG. 5 shows how an embodiment identifies ADDR1, ADDR2, and N for the logic of FIG. 4. For example, ADDR1 in FIG. 4 is the starting address at which latch 403 of FIG. 4 is set, ADDR2 is the address at which latch 403 is reset and a signal is sent AND gate 409, N is the value of register N 407, and EVENT TYPE indicates an event type (e.g., vector instruction completions, stall cycles, etc.) that is signaled on input 404. Accordingly, N is the number of expected events of the indicated type (e.g. vector instructions, stall cycles, etc.) that are to be verified to have occurred between the completion of the instruction at ADDR1 and the completion of the instruction at ADDR2. Embodiments may use multiple such fingerprints, each being identical except for the EVENT TYPE field in order to recognize multiple types of events between the addresses instead of a single event. The fingerprint circuit 110 may also have multiple such fingerprints that are all simultaneously monitored, either between the same instruction addresses or different instruction addresses. The software application 107 does not have direct access to the fingerprint register 104, so in any of the above examples, the software application 107 is configured to instruct the compiler 120 as to how to utilize fingerprint registers 104 as further described below.

One type of optimization performed at the application level is to restructure the code and/or data access pattern so as to improve some aspect of performance such as pipeline stall rate or cache hit rate during an operation such as a matrix multiply. After restructuring the code, the application 207 might expect the operation to exhibit fewer pipeline stalls, a better cache hit rate, or some other improved performance metric.

Having done an optimization such as the one described above, it is beneficial for the application 107 to verify that the expected improvement in the particular processor behavior that was optimized did actually occur. For example, the application 107 may need to ensure that the stall rate or cache hit rate of a code segment that was optimized is actually occurring. In order to do this, embodiments (e.g., the application 107) provide directives to the compiler 120 such as the following:

CHECK (level 1 cache hit rate, 0.9);
. . . optimized code segment
ENDCHECK.

In the above example, software application 107 is directing the compiler 120 to measure the level 1 cache hit rate for the optimized code segment. The "0.9" operand indicates that the compiler is to ensure that the level 1 cache hit rate is at least 90% during execution of the optimized code segment. Accordingly, when the compiler 120 compiles the software application 107 and reads the start check directive, the compiler 120 is configured to start the verification process using a fingerprint recognizer that starts recognizing immediately at the first instruction after of the optimized code section (i.e., at the instruction corresponding to the point where the CHECK directive was recognized (i.e., at the start of the optimized code segment) and stop recognizing at the point where the ENDCHECK directive was recognized (i.e., at the end of the optimized code section). Accordingly, the compiler 120 initializes fingerprint 165 in FIG. 5 so as to specify a cache hit rate of 90% between the instruction that is executed at the point in the program where the CHECK directive appears (e.g., the instruction at ADDR1 in FIGS. 4 and 5) and the instruction that is executed at the point in the program where the ENDCHECK directive appears (e.g., the instruction at ADDR2 in FIGS. 4 and 5). Also, the EVENT field in fingerprint 165 FIG. 5 is set to indicate that input 404 in recognizer 400 in FIG. 4 counts cache hits, and N (407), is set to the minimum number of cache hits that would need to occur between the instruction at ADDR1 and ADDR2 in order to achieve a 90% cache hit rate (e.g. set to 90% of the total number of load instructions between the two addresses). This configures the fingerprint recognizer 400 to monitor the optimized program and cause an EBB if an insufficient number of cache hits is observed between ADDR1 and ADDR2. That is, if the percentage of cache hits for load instructions between ADDR1 and ADDR2 is greater than 90% of the total number of loads between the two instructions, then the fingerprint circuit 110 determines that the optimization to the software application 107 had the intended effect. If the percentage of cache hits is equal to or less than 90%, however, the fingerprint circuit 110 determines that the optimization to the software application 107 did not have the intended effect, and an EBB occurs to alert the application 107 of this result.

This example is shown only for illustrative purposes in order to explain the concept. Actual operations to improve other aspects of processor performance such as branch direction prediction hit rate, branch target prediction hit rate, cache performance at various levels, etc., may also be measured similarly.

In some embodiments, the application 107 may have restructured a code segment such that a sequence of calculations is expected to be performed by a vector unit 175, which can perform arithmetic operations in parallel instead of an arithmetic unit 170, which can only perform operations serially. Accordingly, the compiler 120 may initialize fingerprint 165 so that ADDR1 is the address of the first instruction in the optimized segment, ADDR2 is the address of the last instruction in the optimized segment, N is a value that represents the minimum number of vector instruction completions that is expected to occur between the two addresses, and EVENT is set to indicate that vector instructions are to be counted.

In yet other embodiments, the application 107 may have restructured a code segment such that a particular sequence of events is expected to occur. For example, an application may have restructured the code such that a particular code segment is expected to exhibit a certain cache hit/miss pattern, or such that a particular section of code is expected to exclusively utilize instructions in a vector execution unit rather than an arithmetic unit. In order to verify that a particular code segment is exhibiting the expected pattern, the following code segment is given as an illustrative example.

CHECK (cache hit sequence,1111110);
<optimized code segment>
ENDCHECK.

In the above example, the application 107 has restructured a particular section of code with the expectation that all load instructions within the optimized section are cache hits except for a cache miss when the optimized segment has completed, or all computations are done using vector instructions (represented by "1" in the above sequence) except for the last computational instruction (represented by a "0" in the above sequence). Accordingly, the compiler 120 may utilize the hardware of FIG. 2 to perform the CHECK function by configuring fingerprint circuit 110 in FIG. 2 to begin checking for the "111110" fingerprint at the instruction corresponding to the start of the optimized segment, and to check the fingerprint at the end of the segment. Some embodiments do this by adding a prefix 304 indicating "start" to the instruction corresponding to the start of the optimized section and a prefix indicating "stop and compare fingerprint" to the instruction corresponding to the last instruction of the optimized section. If the expected fingerprint is not recognized when the instruction with the "stop and compare fingerprint" prefix completes, then a lightweight interrupt, referred to as an event based branch (EBB) alerts the application that the expected cache hit behavior has not taken effect. If the expected fingerprint is recognized, however, execution continues uninterrupted.

An embodiment of a fingerprint recognizer/detector may alternatively be used to verify that a particular fingerprint does not appear after software optimization. For example, it is assumed that prior to optimization a program exhibited a particular cache hit/miss sequence that was causing a performance problem. After optimizing the code, the fingerprint circuit 110 may be configured to cause an EBB if that particular sequence (fingerprint) continued to appear, thus determining that the optimization did not take effect. However, when the fingerprint 165 does not appear (i.e., no match), the fingerprint circuit 110 is configured to determine that that optimization has taken its intended effect.

Embodiments may also be configured to recognize whether a measured fingerprint representing a sequence of operations (e.g., cache hit/miss sequence, vector/arithmetic operation sequence) is within a given hamming distance of the expected value of the sequence. If the measured sequence is outside a specified hamming distance from the expected sequence, an EBB occurs, otherwise the program continues uninterrupted.

Various embodiments include a fingerprint recognition function, or fingerprint module. There may be a respective fingerprint recognition function for each type of fingerprint being detected. Each type of fingerprint 165 and/or each combination of fingerprints 165 is indicative of a software optimization executed on the processor 101, software, and/or other hardware of the computer system 100. An embodiment may utilize multiple types of fingerprints, such that whenever all (or a subset of) such fingerprints are simultaneously recognized, compiler verification is indicated.

FIG. 6 is a flow chart of a computer implemented method 600 for verifying the effects of application program optimizations via the fingerprint circuit 110 according to an embodiment. To perform the verification process of optimizations to the software application 107, the application 107 may have to instruct (e.g., via a directive) the compiler 120 to perform various aspects and interact with hardware.

At block 605, application 107 (via processor 101) issues a start verification check. Execution of the start verification check directive alerts, e.g., the compiler 120 to initialize the fingerprint circuit(s) 110. In one implementation, the start verification check directive may cause microcode or firmware in the fingerprint circuit 110 to initialize the fingerprint circuit 110, and/or the start verification directive is a trigger to the compiler 120 to configure fingerprint circuit 110 such that the fingerprint circuit 110 is initialized. As discussed herein, a software optimization is performed to the software application 107 executing on the processor 101 of the computer system 100, and the operator desires to confirm that the software optimization is having the intended effect.

At block 610, the fingerprint circuit 110 is configured to determine whether a fingerprint is present in the output of the software application 107 that is currently executing on the processor 101 of the computer system 100, where the fingerprint 165 comprises a representation of a sequence of behavior that occurs on the processor 101 while the software is executing and where the software is compiled by the compiler 120. The fingerprint 165 is configured to correspond to the software optimization of the software application 107, such that the one fingerprint 165 verifies one optimization, another fingerprint 165 verifies another optimization, and so forth. In order to find the match and/or know when to start looking for the evidence of the optimization, the fingerprint circuit 110 may continuously monitor for the presence of a specified fingerprint related to one or more pipelines 102, cache units (103), branch predictors 160, branch predictor buffers 162, fingerprint tables 165, arithmetic units 170, vector units 175, completion units 180, etc., at block 610, and/or may only monitor for the presence of a specified fingerprint related to instructions at various addresses at block 625.

At block 615, the fingerprint circuit 110 is configured to, in response to determining that the fingerprint 165 is not present in output of the software application 107 currently executing on the processor 101, determine that the optimization to the software application 107 has not occurred. In other words, the optimization did not have the intended consequence.

At block 620, in response to determining that the fingerprint 165 is present in the output of software application 107 executing on the processor 101, the fingerprint circuit 110 is configured to verify that the optimization of the software application 107 has occurred. In other words, the optimization did have the intended consequence.

Determining whether the fingerprint 165 is present in the software that is currently executing on the processor 101 of the computer system 100 occurs in response to identifying that an instruction at a specified address (e.g., ADDR2 in fingerprint table 165) has completed. In response to identifying the completion of the last instruction for which the fingerprint is determined, fingerprint circuit 110 is configured to compare a value in the fingerprint register 104 to the expected fingerprint (e.g., expected fingerprint 165) in order to determine whether the fingerprint is present in the fingerprint register 104.

Identifying the instruction address of the instruction that is the last instruction in a code segment that has been optimized causes output of the software application 107 currently executing on the processor 101 to be placed into a fingerprint register 104, such that a value in the fingerprint register 104 is compared to the fingerprint 165 in order to determine whether the fingerprint is present in the fingerprint register 104.

In one implementation, a start verification check directive (in application 107) may be utilized to direct a compiler to cause the fingerprint circuit start determining whether the fingerprint is present in the software application that is currently executing on the processor of the computer system, and an end verification check directive may be utilized to direct a compiler to cause the fingerprint circuit stop checking. The software optimization is intended to occur between the start verification check directive and the end verification check directive.

Determining whether the fingerprint 165 is present in the software application 107 that is currently executing on the processor 101 of the computer system 100 occurs in response to one or more instruction addresses of the software currently matching one or more predefined instruction addresses.

The fingerprint 165 is defined to have the representation of the sequence of behavior that occurs when the optimization has occurred. For example, the fingerprint circuit 110 may detect a sequence of cache hits and cache misses for load instructions to determine if a pre-specified sequence has occurred. If the pre-specified sequence occurs, the fingerprint circuit 110 determines that the software optimization successfully occurred. Otherwise if the pre-specified sequence has not occurred, the fingerprint circuit 110 determines that the software optimization did not occur. Alternatively, the fingerprint circuit 110 may count the events internal to processor 101 such as instruction or data cache hits or misses, stalls on a processor pipeline 102, or any other events that occur between the time when the instructions at two addresses (ADDR1 and ADDR2) complete. If more than N events occurs, the fingerprint circuit 110 determines that the software optimization successfully occurred. Otherwise, if N or fewer than the expected number of events occurred, the fingerprint circuit 110 determines that the software optimization did not occur. Conversely, fingerprint circuit 110 may recognize that a software optimization occurs if fewer than N events occur between completion of the instructions at ADDR1 and ADDR1. Embodiments may count any type of event that can be used to verify a particular software optimization.

The fingerprint 165 may correspond to an intended change designed to occur for a specified number of instructions following the instruction address at which the intended change is the optimization by the compiler 120. For example, the intended change may be to unroll a loop, perform addition using a vector (or an array of numbers) that performs multiple additions at one time, etc.

Technical effects and benefits include improved performance of a computer processor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for verifying an effect of software program optimization, the method comprising:

determining whether a fingerprint is present in a software application that is currently executing on a processor of a computer system, the fingerprint comprising a representation of a sequence of behavior that occurs on the processor while the software application is executing, wherein the fingerprint corresponds to an optimization made to the software application;

in response to determining that the fingerprint is not present in the software application currently executing on the processor, determining that the optimization to the software application did not have an intended effect; and in response to determining that the fingerprint is present in the software application executing on the processor, recognizing that the optimization to the software application has the intended effect;

wherein the software application has a start verification check directive configured to cause a compiler to cause a fingerprint circuit to begin determining whether the fingerprint is present in the software application that is currently executing on the processor of the computer system;

wherein the software application has an end verification check directive configured to cause the compiler to cause the fingerprint circuit to stop determining whether the fingerprint is present in the software application that is currently executing on the processor of the computer system; and wherein the optimization is intended to occur between the start verification check directive and the end verification check directive.

2. The method of claim 1, wherein determining whether the fingerprint is present in the software application that is currently executing on the processor of the computer system occurs in response to identifying an instruction address of an instruction that is optimized.

3. The method of claim 2, further comprising, in response to identifying the instruction address of the instruction that is optimized, comparing a value in a fingerprint register to the fingerprint in order to determine whether the fingerprint is present in the fingerprint register.

4. The method claim 2, wherein identifying the instruction address of the instruction that is optimized causes output of the software application currently executing on the processor to be placed into a fingerprint register, such that a value in the fingerprint register is compared to the fingerprint in order to determine whether the fingerprint is present in the fingerprint register.

5. The method of claim 1, wherein determining whether the fingerprint is present in the software application that is currently executing on the processor of the computer system occurs in response to one or more instruction addresses of the software application currently matching one or more predefined instruction addresses.

6. A computer program product for verifying an effect of software program optimization, the computer program product comprising:

a computer readable storage medium having program instructions embodied therewith, the program instructions readable by a processing circuit to cause the processing circuit to perform a method comprising:

determining whether a fingerprint is present in a software application that is currently executing on a processor of a computer system, the fingerprint comprising a representation of a sequence of behavior that occurs on the processor while the software application is executing, wherein the fingerprint corresponds to an optimization made to the software application;

in response to determining that the fingerprint is not present in the software application currently executing on the processor, determining that the optimization to the software application did not have an intended effect; and in response to determining that the fingerprint is present in the software application executing on the processor, recognizing that the optimization to the software application has the intended effect;

wherein the software application has a start verification check directive configured to cause a compiler to cause a fingerprint circuit to begin determining whether the fingerprint is present in the software application that is currently executing on the processor of the computer system;

wherein the software application has an end verification check directive configured to cause the compiler to cause the fingerprint circuit to stop determining whether the fingerprint is present in the software application that is currently executing on the processor of the computer system; and wherein the optimization is intended to occur between the start verification check directive and the end verification check directive.

7. The computer program product of claim 6, wherein determining whether the fingerprint is present in the software application that is currently executing on the processor of the computer system occurs in response to identifying an instruction address of an instruction that is optimized.

8. The computer program product of claim 7, the method further comprising, in response to identifying the instruction address of the instruction that is optimized, comparing a value in a fingerprint register to the fingerprint in order to determine whether the fingerprint is present in the fingerprint register.

9. The computer program product claim 7, wherein identifying the instruction address of the instruction that is optimized causes output of the software application currently executing on the processor to be placed into a fingerprint register, such that a value in the fingerprint register is compared to the fingerprint in order to determine whether the fingerprint is present in the fingerprint register.

10. The computer program product of claim 6, wherein determining whether the fingerprint is present in the software application that is currently executing on the processor of the computer system occurs in response to one or more instruction addresses of the software application currently matching one or more predefined instruction addresses.

11. A computer system for verifying an effect of software program optimization, the system comprising:

a memory; and a processor, communicatively coupled to the memory, the computer system configured to perform a method comprising:

determining whether a fingerprint is present in a software application that is currently executing on the processor of the computer system, the fingerprint comprising a representation of a sequence of behavior that occurs on the processor while the software application is executing, wherein the fingerprint corresponds to an optimization made to the software application;

in response to determining that the fingerprint is not present in the software application currently executing on the processor, determining that the optimization to the software application did not have an intended effect; and in response to determining that the fingerprint is present in the software application executing on the processor, recognizing that the optimization to the software application has the intended effect;

wherein the software application has a start verification check directive configured to cause a compiler to cause a fingerprint circuit to begin determining whether the fingerprint is present in the software application that is currently executing on the processor of the computer system;

wherein the software application has an end verification check directive configured to cause the compiler to cause the fingerprint circuit to stop determining whether the fingerprint is present in the software application that is currently executing on the processor of the computer system; and wherein the optimization is intended to occur between the start verification check directive and the end verification check directive.

12. The computer system of claim 11, wherein determining whether the fingerprint is present in the software application that is currently executing on the processor of the computer system occurs in response to identifying an instruction address of an instruction that is optimized.

13. The computer system of claim 12, the method further comprising, in response to identifying the instruction address of the instruction that is optimized, comparing a value in a fingerprint register to the fingerprint in order to determine whether the fingerprint is present in the fingerprint register.

14. The computer system claim 12, wherein identifying the instruction address of the instruction that is optimized causes output of the software application currently executing on the processor to be placed into a fingerprint register, such that a value in the fingerprint register is compared to the fingerprint in order to determine whether the fingerprint is present in the fingerprint register.

15. The computer system of claim 11, wherein determining whether the fingerprint is present in the software application that is currently executing on the processor of the computer system occurs in response to one or more instruction addresses of the software application currently matching one or more predefined instruction addresses.

* * * * *